United States Patent [19]

Geist et al.

[11] Patent Number: 5,086,091
[45] Date of Patent: Feb. 4, 1992

[54] CATHODIC WATER-DILUTABLE BINDERS, WATER-DILUTABLE COATING COMPOSITIONS AND PROCESSES FOR THE PREPARATION OF CATHODIC WATER-DILUTABLE BINDERS BASED ON MERCAPTO-KETIMINE-MODIFIED EPOXY RESINS

[75] Inventors: Michael Geist, Munster, Fed. Rep. of Germany; Klaus Cibura, Southfield, Mich.; Helmut Fobbe; Gunther Ott, both of Munster, Fed. Rep. of Germany

[73] Assignee: BASF Lacke & Farben AG, Münster-Hiltrup, Fed. Rep. of Germany

[21] Appl. No.: 368,316

[22] PCT Filed: Nov. 16, 1987

[86] PCT No.: PCT/EP87/00713
§ 371 Date: Nov. 20, 1989
§ 102(e) Date: Nov. 20, 1989

[87] PCT Pub. No.: WO88/03941
PCT Pub. Date: Jun. 2, 1988

[30] Foreign Application Priority Data

Nov. 18, 1986 [DE] Fed. Rep. of Germany ....... 3639488

[51] Int. Cl.$^5$ .............. C09D 5/44; C08G 59/66
[52] U.S. Cl. ........................ 523/415; 523/416; 523/417; 523/421; 528/109; 528/45
[58] Field of Search ............ 523/415, 416, 417, 421; 528/109

[56] References Cited

U.S. PATENT DOCUMENTS

| | | | |
|---|---|---|---|
| 3,947,339 | 3/1976 | Jerabek et al. | 524/901 |
| 4,017,438 | 4/1977 | Jerabek et al. | 523/415 |
| 4,148,772 | 4/1979 | Marchetti et al. | 528/110 |
| 4,252,703 | 2/1981 | Patzschke et al. | 523/415 |
| 4,557,814 | 10/1985 | Schupp et al. | 523/415 |
| 4,596,842 | 6/1986 | Chung et al. | 528/361 |
| 4,956,402 | 9/1990 | Perner et al. | 523/415 |

FOREIGN PATENT DOCUMENTS 0198783 10/1986 European Pat. Off. .
1132035 3/1957 France .
2329727 5/1977 France .

*Primary Examiner*—John Kight, III
*Assistant Examiner*—Frederick Krass
*Attorney, Agent, or Firm*—Kenyon & Kenyon

[57] ABSTRACT

The invention relates to cathodic water-dilutable binders which contain primary amino groups neutralized with acids and introduced via ketimine groups. The binders have been prepared by reacting (A) a synthetic resin containing epoxy groups with
(B) at least one compound which, in addition to a mercapto group which is reactive toward epoxy groups, also possesses at least one ketimine group, and, if required,
(C) other modifying compounds, such as, for example, monocarboxylic acids and/or other primary and/or secondary amines, and have then been neutralized with an acid.

16 Claims, No Drawings

CATHODIC WATER-DILUTABLE BINDERS, WATER-DILUTABLE COATING COMPOSITIONS AND PROCESSES FOR THE PREPARATION OF CATHODIC WATER-DILUTABLE BINDERS BASED ON MERCAPTO-KETIMINE-MODIFIED EPOXY RESINS

The invention relates to cathodic water-dilutable binders which contain primary amino groups neutralized with acids and introduced via ketimine groups.

Cathodic water-dilutable binders are required for the production of electrocoating paints for cathodic electro-coating. Cationic electrocoating is a coating process frequently used in particular for priming, in which water-dilutable synthetic resins carrying cationic groups are applied to electrically conductive articles with the aid of direct current.

It has been found that the presence of primary amino groups in the binder molecules has a positive effect on the quality of the coatings obtained.

In order to introduce primary amino groups into the binder molecules, it has been suggested that synthetic resins containing epoxy groups be reacted with poly(ketimines) which contain hydroxyl groups or secondary amino groups, and the primary amino groups then be liberated hydrolytically (cf. U.S. Pat. No(s). 3,947,339, 4,017,438, 4,104,147 and 4,148,772).

The introduction of primary amino groups via ketimine derivatives containing hydroxyl or secondary amino groups has, inter alia, the disadvantage that these ketimine derivatives react so slowly with the epoxy groups that troublesome side reactions may take place and unconverted ketimine derivatives remain in the reaction mixture. These unconverted ketimine derivatives are hydrolyzed in the aqueous phase to give low molecular weight amines, which have a negative effect on the properties of the electrically deposited and baked coatings.

The object of the present invention is to provide improved binders of the type stated at the outset.

This object is achieved by binders which have been prepared by reacting (A) a synthetic resin containing epoxy groups with (B) at least one compound which, in addition to a mercapto group which is reactive toward epoxy groups, also possesses at least one ketimine group and, if required, (C) further modifying compounds, such as, for example, monocarboxylic acids and/or further primary and/or secondary amines, and have then been neutralized with an acid.

All synthetic resins which contain epoxy groups and are suitable as starting materials for the preparation of cathodic, water-dilutable binders can be used as component (A) (cf. for example U.S. Pat. No(s). 3,947,399, 4,017,438, 4,104,147, 4,148,772 and European Patent 4090). Unmodified or modified polyglycidyl ethers of polyphenols, polyglycidyl esters, polyacrylates containing epoxy groups and epoxidizied polybutadiene may be mentioned as examples.

Polyglycidyl ethers prepared from polyphenols, preferably bisphenol A, and epihalohydrins are preferably used as component (A).

The well known modified polyglycidyl ethers of polyphenols, preferably bisphenol A, are particularly preferably used. Particularly preferably used modified polyglycidyl ethers of polyphenols, preferably bisphenol A, are the polyglycidyl ethers of polyphenols, which ethers have been modified by reaction with at least one compound which contains, per molecule, one or more, preferably two, hydroxyl groups bonded to aromatic and/or (cyclo)-aliphatic molecular fragments (cf. for example German Patent Application P 36 18 157.9).

Compounds which, in addition to a mercapto group which is reactive toward epoxy groups, also possess at least one ketimine group are used as component (B). The compounds can, in addition to the mercapto and ketimine group, also contain further functional groups if these groups do not interfere with the binder synthesis.

Compounds of the general formula

$$HS-R^1-(N=CR^2R^3)_n (I)$$

in which $R^1$ represents an organic group, preferably an alkylene group, $R^2$ and $R^3$ represent organic groups, preferably alkyl groups having 1 to 4 C atoms, and $R^2$ and $R^3$ together can also form a cycloaliphatic ring, and n represents an integer 1, are preferably used as component (B). These compounds can readily be prepared by ketiminization of mercapto compounds of the general formula $HS-R^1-(NH_2)_n$ ($R^1$ represents an organic group, preferably an alkylene group, and n represents an integer $\geq 1$) with ketones of the general formula $O=CR^2R^3$ ($R^2$ and $R^3$ represent organic groups, preferably alkyl groups having 1 to 4 C atoms, and $R^2$ and $R^3$ together can also form a cycloaliphatic ring). (B) components according to the invention can be prepared, for example, by reacting 2-mercaptoethylamine with acetone, methyl ethyl ketone, methyl isobutyl ketone, cyclohexanone, cyclopentanone or acetophenone. Methyl isobutyl ketone is preferably used.

Compounds of the general formula $HS-R^4-CO-NR^5-R^6-N=CR^7R^8$ (II) ($R^4$ represents an organic group, preferably an alkylene group, $R^5$ represents an organic group, preferably an alkyl group, or represents $-R^6-N=CR^7R^8$, $R^6$ represents an organic group, preferably an alkylene group, and $R^7$ and $R^8$ represent organic groups, preferably alkyl groups having 1 to 4 C atoms, and $R^7$ and $R^8$ together can also form a cycloaliphatic ring) are also preferably used as component (B).

Compounds of this type can be prepared, for example, by reacting mercaptocarboxylic acids or mercaptocarboxylates with the relevant ketimines according to the following equations (the radicals $R^4$ to $R^8$ have the same meaning as described above):

$$HS-R^4-COOH + HNR^5-R^6-N=CR^7R^8 \rightarrow (II) + H_2O$$

$$HS-R^4-COOR^9 + HNR^5-R^6-N=CR^7R^8 \rightarrow (II) + HOR^9$$

$R^9$ represents an organic radical, preferably an alkyl radical having 1 to 4 C atoms.

The ketimines shown in the above equations can readily be prepared by reacting the corresponding primary/secondary polyamines with appropriate ketones by well known methods. Diethylenetriamine, dipropylenetriamine, dihexylenetriamine and hydroxyethylaminoethylamine may be mentioned as examples of suitable primary/secondary polyamines.

Components (A) and (B) can either be reacted in proportions such that the reaction product no longer contains any epoxy groups or that the reaction product still contains free epoxy groups, which, depending on the desired product properties, can then be used for further modification reactions, such as, for example, reaction with monocarboxylic acids, such as, for example, fatty acids or Versatic acid and/or primary and/or secondary amines, such as, for example, methylethanolamine or dicocosamine. Of course, the hydroxyl groups present in the reaction product can also be used for further modification reactions.

The binders according to the invention can be converted into self-crosslinking systems by other generally known methods and/or used together with crosslinking agents, such as, for example, blocked polyisocyanates, phenol resins, melamine resins or compounds having activated ester bonds, as externally crosslinking systems.

A self-crosslinking system can be obtained, for example, by reacting the binder with a partially blocked polyisocyanate which on average possesses one free isocyanate group per molecule and whose blocked isocyanate groups are deblocked only at elevated temperatures.

Finally, the binder obtained is dispersed in water with the addition of water-soluble acids (for example formic acid, lactic acid, propionic acid . . . ,) and with hydrolysis of the ketimine groups and is further processed by well known methods to give an aqueous electrocoating paint.

The invention also relates to a process for the preparation of cathodic water-dilutable binders which contain primary amino groups neutralized with acids and introduced via ketimine groups.

In this process (A) a synthetic resin containing epoxy groups is reacted with (B) at least one compound which, in addition to a mercapto group which is reactive toward epoxy groups, also possesses at least one ketimine group and, if required, also with (C) further modifying compounds, such as, for example, monocarboxylic acids and/or other primary and/or secondary amines and the reaction product obtained is neutralized with an acid.

The reaction of the epoxy resin with component (B) is preferably carried out at temperatures between 50 and 180° C. and can, for example, be catalysed by the addition of tin octoate or ethyltriphenylphosphonium iodide. The reaction conditions should be chosen so that the blocked primary amino groups are liberated only when there are no longer any possibilities for the formation of relatively high molecular weight products.

The invention also relates to water-dilutable coating compositions for the production of heat-curable coatings which are preferably cathodically deposited and whose binders consist at least partially of binders which contain primary amino groups neutralized by acids and introduced via ketimine groups and where the binders containing primary amino groups have been prepared by reacting (A) a synthetic resin containing epoxy groups with (B) at least one compound which, in addition to a mercapto group which is reactive toward epoxy groups, also possesses at least one ketimine group and, if required, (C) further modifying compounds, such as, for example, monocarboxylic acids and/or other primary and/or secondary amines, and have then been neutralized with an acid.

The coating compositions according to the invention can contain, in addition to the binder, further conventional additives, such as, for example, crosslinking agents, coalescing solvents, pigments, surface-active agents, crosslinking catalysts, antioxidants, fillers, antifoams, etc.

The water-dilutable coating compositions prepared with the aid of the binders according to the invention are suitable in particular for the cationic electrocoating process; however, they can also be used in conventional coating processes. For example, metals which may have been pretreated, such as iron, steel, copper, zinc, brass, magnesium, tin, nickel, chromium and aluminum, as well as impregnated paper and other electrically conductive substrates can be used as coating substrates.

The advantages obtained using the invention consist, in particular, in that the coating compositions prepared from the binders according to the invention have—in comparison with the prior art—a lower content of low molecular weight amines, which has a positive effect on the properties of the electrically deposited and baked coatings.

The invention is illustrated in more detail in the Examples which follow. All data on parts and percentages are weight data, unless expressly stated otherwise.

EXAMPLE 1

Preparation of a mercaptoalkylketimine 309 parts of dry diethylenetriamine are dissolved in 400 parts of methyl isobutyl ketone under inert gas in a suitable reaction apparatus consisting of a reaction vessel, a stirring means and a water separator. The initially taken reaction mixture is slowly heated to 145° C., 103 g of water collecting in the separator in the course of 4 hours under reflux. 325 parts of 2-mercaptopropionic acid are then added to the resulting ketimine solution at room temperature. 51 g of water (94.4% of theory) are separated off under atmospheric pressure at 130° to 160° C., and the mercaptoalkylketimine solution is diluted to 80% with methyl isobutyl ketone. Amine equivalent weight: 221 g/mol of amine.

EXAMPLE 2

Preparation of a crosslinking agent I

A blocked isocyanate crosslinking agent is prepared according to German Laid-Open Application DOS 2,701,002, Example 1, by adding 218 parts of 2-ethylhexanol, slowly, with stirring and in a nitrogen atmosphere to 291 parts of an 80/20 isomer mixture of 2,4-/2,5-toluylene diisocyanate, the reaction temperature being kept below 38° C. by external cooling. The mixture is kept at 38° C. for a further half hour and then heated to 60° C., after which 75 parts of trimethylolpropane and then 0.08 parts of dibutyltin dilaurate, as a catalyst, are added. After an exothermic reaction at the beginning, the mixture is kept at 121° C. for 1.5 hours, when essentially all the isocyanate groups have been consumed, which is detectable from the infrared spectrum. The mixture is then diluted with 249 parts of ethylene glycol monoethyl ether.

EXAMPLE 3

Preparation of a crosslinking agent II

A polyester crosslinking agent is prepared according to European Patent 57,389, Example 1. 109 parts of pentaerythritol are mixed with 474 parts of phthalic anhydride in a reaction vessel having a reflux condenser, a stirrer, an internal thermometer and a gas inlet tube, and heated to 140° C. under nitrogen. The reaction then takes place exothermally and is kept at 160° C. by cooling. At an acid number of 305, the mixture is cooled and 300 parts of methyl isobutyl ketone are added. At 90° C., 231 parts of butylene oxide are slowly added dropwise and the mixture is kept at the temperature until the acid number has fallen to zero.

EXAMPLE 4

Preparation of a dispersion I

A reactor which is equipped with a heating means, a stirrer, a condenser, a thermometer and a nitrogen inlet is charged with 837 parts of a bisphenol A/epoxy resin having an epoxide equivalent weight of 188, 72 parts of xylene, 254 parts of bisphenol A and 3 parts of dimethyl benzylamine. The temperature is increased to 130° C. and the reaction is carried out until an epoxide equivalent weight of 480 has been reached. Thereafter, 300 parts of a commercial polycaprolactonediol having a molecular weight of 535 and a further 3 parts of dimethylbenzylamine are added. The reaction is continued at 130° C. until the reaction mixture has an epoxide equivalent weight of 1,200. Thereafter, 1,200 parts of the crosslinking agent II described above are added. The reaction temperature is reduced to 99° C. by external cooling. 300 parts of the mercaptoalkylketimine described in Example 1 and 66 parts of N-methylethanolamine are metered in, the reaction temperature being kept below 110° C. by cooling. Thereafter, the reaction mixture is diluted with 137 parts of hexyl monoglycol ether, cooled to 90° C. and discharged. A clear resin solution results.

In the meantime, a dispersing bath consisting of 1,485 parts of deionized water, 26 parts of glacial acetic acid and 2 parts of a commercial antifoam is prepared by introducing 2,700 g of the resin solution described above, while stirring. The dispersion mixture is stirred for two hours and then a further 1,825 parts of deionized water are added. A low-viscosity dispersion having an experimentally determined solids content of 36.0% results.

EXAMPLE 5

Preparation of a dispersion II 2,000 parts of a commercial bisphenol A/epoxy resin (epoxide equivalent weight 500), 116 parts of xylene, 262 parts of dodecylphenol and 314 parts of dimenthylbenzylamine [sic] are reacted at 130° C. in a suitable reaction apparatus until an epoxide equivalent weight of 1,100 is reached. Thereafter, 270 parts of xylene, 145 parts of hexylglycol and 160 parts of diethanolamine are added at 110° C., and after a further 15 minutes 100 parts of the mercaptoalkylketimine described in Example 1 and 200 parts of butylglycol and 350 parts of isobutanol. The reactor content is allowed to react for 60 minutes at 100° C. and cooled to 90° C., and the clear resin solution is discharged.

1,120 parts of the warm resin solution are introduced into a dispersing bath composed of 752 parts of deionized water, 350 parts of the crosslinking agent II described in Example 3, 2 parts of a commercial antifoam and 13 parts of glacial acetic acid. After the mixture has been stirred for two hours, a further 960 parts of deionized water are added. A low-viscosity dispersion having an experimentally determined solids content of 36.8% is obtained.

Preparation of the electrocoating baths and deposition of coating films 1,675 parts of deionized water are initially taken in a suitable vessel, and 25 parts of 10% strength acetic acid are added. 2,279 parts of the binder dispersion and 775 parts of the pigment paste described in EP 102 501 B 1 (Example 7) are stirred into this solution, and the mixture is made up with 246 parts of deionized water. Before the depositions, the coating baths are aged for 3 days while stirring.

Deposition of the coating films is effected at 300 V in the course of 2 minutes on zinc-phosphatized steel sheets which are connected as the cathode. After the usual aftertreatment, the films are baked at 180° C. for 20 minutes.

Deposition result

| Bath | I | II |
| --- | --- | --- |
| Film thickness (μm) | 20 | 23 |
| at voltage (V) | 300 | 370 |
| Leveling* | 1.0 | 1.5 |
| Crater evaluation* | 0.5 | 0.5 |
| Crosshatch test* | 0 | 0 |
| Reverse impact (inch pounds) | 80 | 80 |
| C (bath)** | 1.11 | 1.06 |

*0 = best value
5 = poorest value
**Conductivity of the coating bath in $10^{-9}$S·cm$^{-1}$

We claim:

1. A cathodic water-dilutable binder containing primary amino groups and neutralized with acid comprised of the reaction product of:
   (A) an epoxy group containing resin, and
   (B) a compound having a mercapto group which is reactive with epoxy groups and at least one ketimine group,
   and wherein the reaction product is neutralized with acid.

2. The cathodic water-dilutable binder of claim 1 further comprised of (C) a monocarboxylic acid or a primary or secondary amino group containing compound.

3. The cathodic water-dilutable binder of claim 1 wherein the epoxy group containing resin (A) is comprised of a polyglycidyl ether, a polyglycidyl ester, an epoxy group containing polyacrylate resin or an epoxidized polybutadiene.

4. The cathodic water-dilutable binder of claim 3 wherein the polyglycidyl ether is the reaction product of a polyglycidyl ether and a compound which contains one or more hydroxyl groups bonded to an aromatic or (cyclo)aliphatic group.

5. The cathodic water-dilutable binder of claim 1 wherein (B) comprises a compound represented by the formula I:

$$HS-R^1-(N=CR^2R^3)_n \qquad I$$

wherein $R^1$ is alkylene; $R^2$ and $R^3$ are each $C_{1-4}$ alkyl or together with the ketimine carbon form a cycloaliphatic ring, and n is an integer greater than or equal to one.

6. A cathodic water-dilutable binder of claim 1 wherein (B) is comprised of a compound represented by the formula II:

$$HS-R^4-CO-NR^5-R^6-N=CR^4R^8 \qquad II$$

wherein $R^4$ and $R^6$ are independently alkylene;

$R^5$ is alkyl or a radical of the formula $-R^6-N=CR^7R^8$; and $R^7$ and $R^8$ independently represent $C_{1-4}$ alkyl groups, or taken together with the ketimine carbon represent a cycloaliphatic ring.

7. The cathodic, water-dilutable binder of claim 2 wherein (C) is comprised of a fatty acid, a versatic acid, a primary amine containing compound or a secondary amine containing compound.

8. The cathodic, water dilutable binder of claim 7 wherein the primary amine or secondary amine containing compound is methylethanolamine or dicocosamine.

9. A water-dilutable composition for the production of a heat-curable coating comprised of a pigment, crosslinking agent and a cathodic, water-dilutable binder which is comprised of the reaction product of:
(A) an epoxy group containing resin, and
(B) a compound having a mercapto group which is reactive with epoxy groups and at least one ketimine group,
said binder being diluted in water and neutralized with acid.

10. The coating composition of claim 9 wherein the reaction product is neutralized with acid prior to addition of the pigment and crosslinking agent.

11. The coating composition of claim 9 wherein the epoxy group containing resin (A) of the binder is comprised of a polyglycidyl ether, a polyglycidyl ester, an epoxy group containing polyacrylate resin or an epoxidized polybutadiene.

12. The water dilutable coating composition of claim 9 wherein the crosslinking agent is comprised of a blocked isocyanate or a polyester.

13. The water-dilutable coating composition of claim 9 wherein the binder is further comprised of (C) a monocarboxylic acid, a primary amino-group containing compound or a secondary amino-group containing compound.

14. A coating composition of claim 11 wherein the epoxy-group containing resin is comprised of a polyglycidyl ether of a polyphenol and an epihalohydrin.

15. A coating composition of claim 9 wherein component (B) is a compound of the formula (I) or (II):

$$HS-R^1-(N=CR^2R^3)_n \qquad (I)$$

$$HS-R^4-CO-NR^5-R^6-N=CR^4R^8 \qquad (II)$$

wherein:

$R^1$ and $R^4$ independently represent alkylene groups;

$R^2$ and $R^3$ each represent $C_{1-4}$ alkyl groups or together with the ketimine carbon atom represent a cycloaliphatic ring;

n is an integer greater than or equal to one;

$R^5$ represents an alkyl group or $-R^6-N=CR^7R^8$;

$R^6$ represents an alkylene group; and $R^7$ and $R^8$ each represent $C_{1-4}$ alkyl or together with the ketimine carbon represent a cycloaliphatic ring.

16. A process for the preparation of a cathodic water-dilutable binder containing primary amino groups comprising:

reacting (A) a synthetic epoxy group-containing resin with (B) a compound having a mercapto group which is reactive with epoxy groups and at least one ketimine group, and reacting the ketimine group with acid to form a primary amino group containing water-dilutable binder.

* * * * *

UNITED STATES PATENT AND TRADEMARK OFFICE
CERTIFICATE OF CORRECTION

PATENT NO. : 5,086,091

DATED : February 4, 1992

INVENTOR(S) : Michael Geist, et al.

It is certified that error appears in the above-identified patent and that said Letters Patent is hereby corrected as shown below:

Column 2, line 22, change "integer 1," to --integer $\geq$ 1,--.

Column 7, line 8, change "=CR$^4$" to -- =CR$^7$ --.

line 12, change "-R-" to -- -R$^6$- --.

line 13, change "$^6$-" to -- - --.

Column 8, line 18, change "(I)" to -- (I) or --.

line 19, change "-r$^4$-" to -- -R$^4$- --.

line 19, change "=CR$^4$" to -- =CR$^7$ --.

Signed and Sealed this

Twenty-third Day of November, 1993

Attest:

BRUCE LEHMAN

*Attesting Officer*     *Commissioner of Patents and Trademarks*